United States Patent [19]

Park

[11] Patent Number: 5,660,618
[45] Date of Patent: Aug. 26, 1997

[54] GAS-LIQUID SEPARATING APPARATUS FOR A GAS BOILER

[75] Inventor: Jae Kyeong Park, Incheon, Rep. of Korea

[73] Assignee: Daewoo Electronics Co., Ltd., Seoul, Rep. of Korea

[21] Appl. No.: 502,031

[22] Filed: Jul. 13, 1995

[51] Int. Cl.⁶ .................................................. B01D 19/00
[52] U.S. Cl. .............................. 96/204; 95/262; 96/206; 96/220
[58] Field of Search ........................ 96/204, 206, 207, 96/215, 220; 95/260, 262

[56] References Cited

U.S. PATENT DOCUMENTS

| | | | |
|---|---|---|---|
| 3,003,580 | 10/1961 | Lanning | 95/260 X |
| 3,488,926 | 1/1970 | Gilman | 96/204 |
| 4,027,691 | 6/1977 | Roffelsen | 96/204 X |
| 5,348,570 | 9/1994 | Ruppert, Jr. et al. | 96/220 X |
| 5,490,874 | 2/1996 | Kuster et al. | 96/204 |

*Primary Examiner*—Richard L. Chiesa
*Attorney, Agent, or Firm*—Lowe, Price, LeBlanc & Becker

[57] ABSTRACT

Disclosed is a novel gas-liquid separating apparatus which is installed directly on a hot-water heating line independently from a gas boiler. The gas-liquid separating apparatus has a body provided with an air vent hole opened to outside, wherein the liquid flows, and a bubble collecting device for collecting the bubbles from the liquid to vent out the collected bubbles through the air vent hole. The bubble collecting device has a plurality of cylindrical bubble collecting rods for collecting bubbles contained in the liquid, a round projected portion for supporting upper portions of the bubble collecting rods, the round projected portion having a space portion for collecting bubbles collected by the bubble collecting rods being supported by the air vent hole and a conical vent portion having a conical space portion connected to the space of the round projected portion. At an upper portion of the conical vent portion, an air vent for venting out the bubbles is mounted. Small bubbles contained in the hot water generated by a gas boiler are collected by the bubble collecting device. Small bubbles are combined with each other and continue to grow in size. Grown bubble ascends by self buoyancy to be vented through the air vent hole.

10 Claims, 4 Drawing Sheets

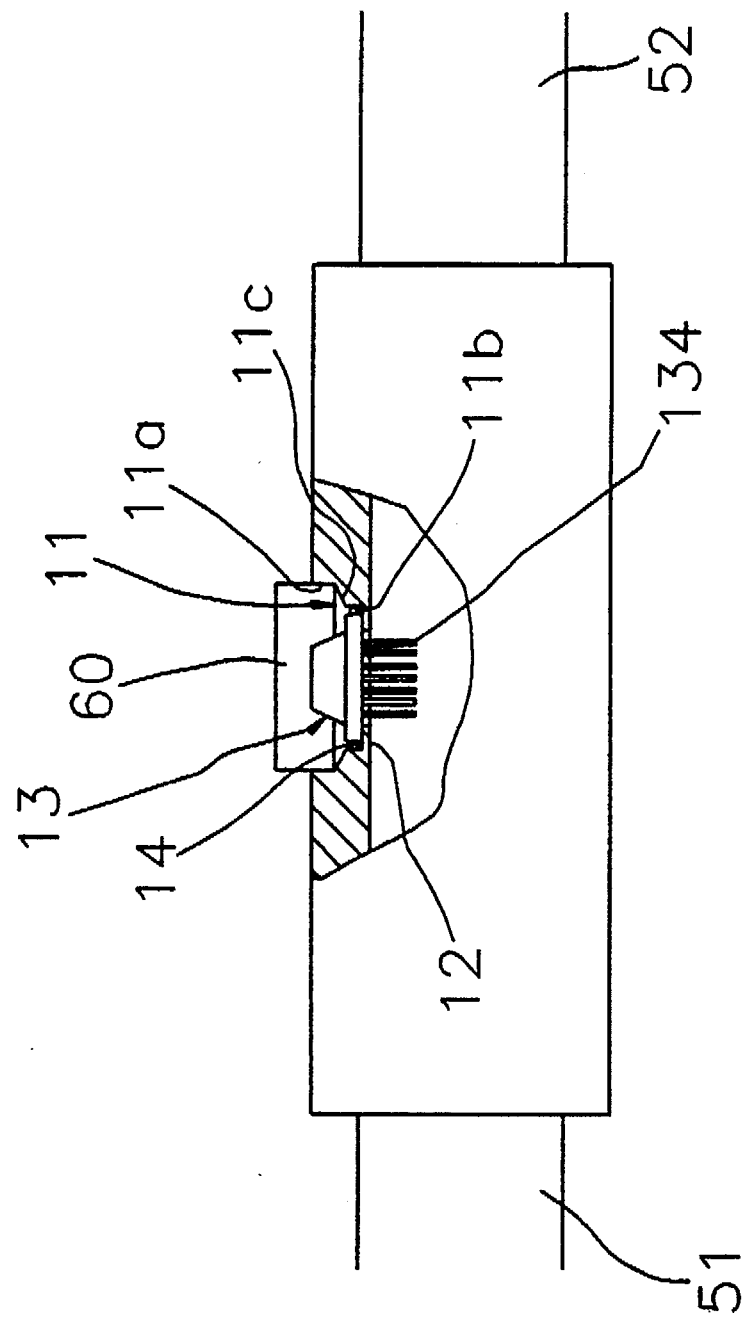

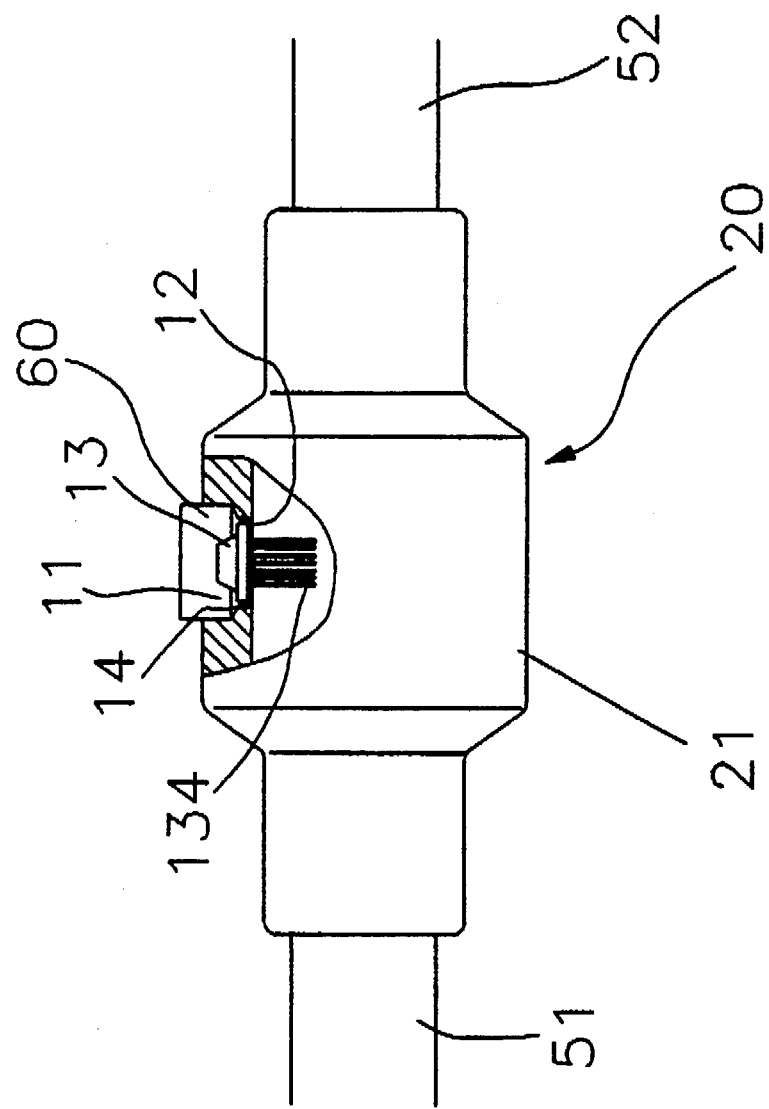

GAS-LIQUID SEPARATING APPARATUS FOR A GAS BOILER

BACKGROUND OF THE INVENTION

1. Field of the Invention

The present invention relates to a gas-liquid separating apparatus. More particularly, the present invention relates to a gas-liquid separating apparatus which can easily separate bubbles from liquid of which a hot-water line enables the circulation by a pump in a heating system such as a gas boiler.

2. Prior art

Generally, gas boilers having a hot-water heating system using heated water are widely used at home. In these systems, a small number of bubbles pass through a hot-water line together with liquid in the hot water line wherein the liquid flows or circulates by the pump. When such bubbles contained in the liquid circulate through the hot-water heating line at the same time when a fluid flows therethrough, it causes the pump cavitation and therefore, the pump efficiencies are lowered. Further, it becomes the reasons of a break-down in the system, and the heat transfer is hindered to reduce the whole thermal efficiency of the heating system. Therefore, it will be preferable to easily and efficiently separate the bubbles from the liquid.

Conventionally, to separate the bubbles from the liquid, there has been proposed a gas-liquid separating apparatus using the concentric force of the liquid. FIG. 1 is a perspective view for showing a conventional gas-liquid separating apparatus and FIG. 2 is a plan sectional view taken along line A-A' of FIG. 1. As shown in FIGS. 1 and 2, the conventional gas-liquid separating apparatus is provided with a cylindrical gas-liquid separating barrel 2 which has a cylindrical gas-liquid separating space 1 having an air vent hole 6 formed at the center upper portion thereof. An air vent (not shown) is mounted on the upper portion of air vent hole 6. A liquid introducing tube 3 is formed on an upper portion of gas-liquid separating barrel 2 in the direction of a tangent line. A liquid exhaust tube 4 is formed on a lower portion of the opposite side thereof in the opposite direction of the above tangent line. A conical rod 5 is installed at the center of the inside of cylindrical gas-liquid separating space 1.

A fluid is introduced into barrel 2 through liquid introducing tube 3 and then out through liquid exhaust tube 4 formed on the lower portion of the opposite side thereof. At this time, as shown in FIGS. 1 and 2, the fluid is rotated in the direction of the arrow in gas-liquid separating barrel 2 and flows directly to liquid exhaust tube 4 from liquid introducing tube 3. Since a part of liquid without bubbles which is introduced through liquid introducing tube 3 has a relatively high density compared with another part of the liquid with bubbles, the first parts of liquids without bubbles flow along the outer lines apart from the center portion of gas-liquid separating barrel while the second parts of liquid with bubbles flow centering around conical rod 5. At this time, small bubbles contained in the liquid collide with one another to grow in size. The bigger bubbles are separated from the liquid to ascend upwards. The isolated bubbles are drawn out through air vent hole 6 having an air vent (not shown) disposed at the upper portion thereof.

The air vent is such a device that, when the volume of the air which has been isolated from the water and collected therein exceeds a predetermined value, a valve thereof opens and selectively vents the collected bubbles out through air vent hole 6. This air vent is widely known and easily available in markets. In this manner, the bubbles can be removed from the liquid.

The gas-liquid separating apparatus performs separation of bubbles from liquid using the centrifugal separating manner according to density difference of the liquid. Therefore, for the purpose of performance of centrifugal separation, a gas-liquid separating barrel having a separation space of a sufficiently large volume is necessary. In order to install such a gas-liquid separating barrel in a gas boiler, an additional space in the gas boiler is necessary, which results in a bulky gas boiler. In addition, the gas-liquid separating barrel gets in the way of other neighboring components, so that it is relatively difficult to manufacture the gas boiler, and it raises the cost of the gas boiler as well.

SUMMARY OF THE INVENTION

Accordingly, to overcome the above-described problems, an object of the present invention is to provide a novel gas-liquid separating apparatus which is installed directly on a hot-water heating line independently from a gas boiler.

To achieve the above-described object, the present invention provides a gas-liquid separating apparatus for separating bubbles from a liquid, which comprises:

a body provided with an air vent hole opened to outside, the liquid flowing in the body; and a bubble collecting means for collecting the bubbles from the liquid to vent out the collected bubbles through the air vent hole.

According to one embodiment of the present invention, the air vent hole includes a first cylindrical space portion formed at an upper outer portion of the air vent hole; a second cylindrical space portion having smaller diameter than the first cylindrical space portion, the second cylindrical space portion being located below the first cylindrical space portion; an inclined portion which connects the first cylindrical space portion to the second cylindrical space portion; and an engaging round jaw on which the bubble collecting device is supported at a lower portion of the second cylindrical spaced portion. Further, the bubble collecting means may include a plurality of cylindrical bubble collecting rods for collecting bubbles contained in the liquid; a round projected portion for supporting upper portions of the bubble collecting rods, the round projected portion having a space portion for collecting bubbles collected by the bubble collecting rods being supported by the air vent hole; and a conical vent portion having a conical space portion connected to the space of the round projected portion and at an upper portion of the conical vent portion an air hole connected to an air vent which is opened to vent out the bubbles which have been introduced from the conical space portion when a volume of air in the air vent exceeds a predetermined value.

In a preferred embodiment of the present invention, the gas-liquid separating apparatus may includes a sealing means such as an O-ring for sealing a gap formed between the air vent hole and the bubble collecting means.

The body of the gas-liquid separating apparatus according to the present invention has a cylindrical shape suitable for connecting two pipes. Preferably, the body has a central portion where the bubble collecting means is formed and both side portions centering the central portion and the centering portion has a diameter greater than that of the side portions. In such a case, the flow rate of the liquid is lowered to enhance the separation efficiency.

The heated water passes through the gas-liquid separating means of the present invention by a pump. Small bubbles contained in the liquid are collected by the bubble collecting means and then these bubbles combine with each other to continuously grow in size. Grown bubble ascends to pass through the air vent hole. In this manner, the bubbles of the liquid which flows through the hot-water heating line can be easily removed.

BRIEF DESCRIPTION OF THE DRAWINGS

The above objects and other advantages of the present invention will become more apparent by describing in detail a preferred embodiment thereof with reference to the attached drawings in which:

FIG. 3 is a partial front sectional view for showing a gas-liquid separating apparatus according to one embodiment of the present invention;

FIG. 6 is a partial front sectional view for showing a gas-liquid separating device according to another embodiment of the present invention.

DESCRIPTION OF THE PREFERRED EMBODIMENT

Hereinafter, the present invention will be described in detail with reference to the attached drawings.

Figure 4:
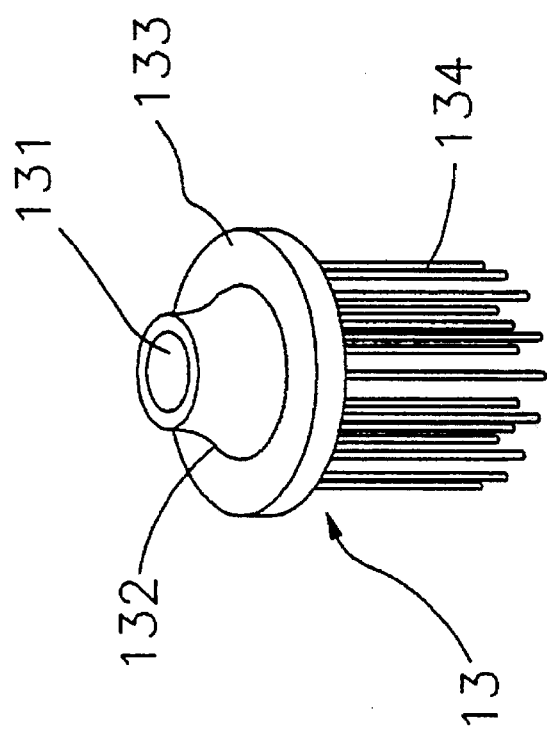
FIG. 4 is a perspective view for showing a bubble collecting device of FIG. 3.

FIG. 3 is a partial front sectional view for a gas-liquid separating apparatus according to one embodiment of the present invention. FIG. 4 is a perspective view for showing a bubble collecting device of FIG. 3.

As shown in these figures, a gas-liquid separating apparatus has a body 10 which connects two pipes 51 and 52. A gas vent hole 11 which is opened to outside is formed at an upper portion of body 10 through which a liquid flows. As shown in the figures, gas vent hole 11 has a first cylindrical space portion 11a formed at the upper outer side thereof and a second cylindrical space portion 11b having smaller diameter than first cylindrical space portion 11a which is disposed below first cylindrical space portion 11a. An inclined portion 11c is formed between first cylindrical space portion 11a and second cylindrical space portion 11b. A round engaging jaw 12 is formed at a lower portion of second cylindrical space portion 11b. On an inner surface of first cylindrical space portion 11a, screw grooves are formed so as to fix an air vent to an upper portion of air vent hole 11.

The gas-liquid separating apparatus includes a bubble collecting device 13 which is supported by engaging jaw 12. A plurality of cylindrical bubble collecting rods 134 which are in contact with the liquid which flows through body 10 to collect bubbles contained therein are arranged in parallel at a predetermined distance under bubble collecting device 13. Bubble collecting rods 134 may be comprised of a material such as a metal (for example, Fe), a plastic material, etc. considering the absorption force in relation with bubble. At this time, each of bubble collecting rods 134 is individually formed changeably and the radius, the number and the length of bubble collecting rods are determined in accordance to the viscosity of liquid, the flow rate of the liquid and the desired separation rate of bubbles. A round projected portion 133 which supports the upper portions of bubble collecting rods 134 and mounts bubble collecting device 13 on round engaging jaw 12 of air vent hole 11 is provided at the upper portions of bubble collecting rods 134. Inside round projected portion 133, a space portion in which bubbles gathered by bubble collecting rod 134 can be collected is formed. On round projected portion 133, a conical vent portion 132 having therein a conical inner space communicating with the space portion of round projected portion 133 is formed. The upper portion of conical vent portion 132 has an air hole 131 which is opened. Over conical vent portion 132, an air vent 60 is provided, which vents out the inner gas therethrough when the volume of the collected air in the air vent which has been separated from the gas-liquid separating apparatus exceeds a predetermined value. Inside air vent 60, when the volume of the collected air in air vent 60 exceeds a predetermined value, a float (not shown) descends to open air vent hole 11 so that the air vent is opened to vent the air out therethrough. After the air venting, the float again ascends due to the buoyancy of water to close air vent 60. Such an air vent is widely known and one which can be available in markets can be used in the present invention.

Further, according to the present embodiment, an O-ring 14 is provided which seals a gap formed between the inner surface of second cylindrical space portion 11b of air vent hole 11 of body 10 and bubble collecting device 13 and fixes bubble collecting device 13 to air vent hole 11.

Figure 2:
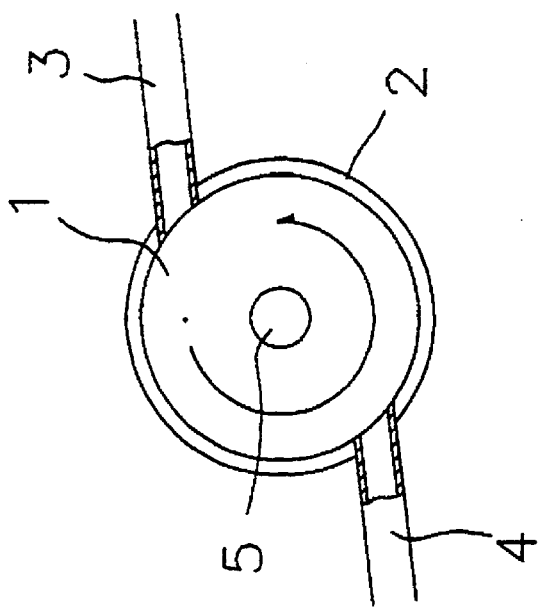
FIG. 2 is a plan sectional view taken along line A-A' of FIG. 1.
Figure 1:
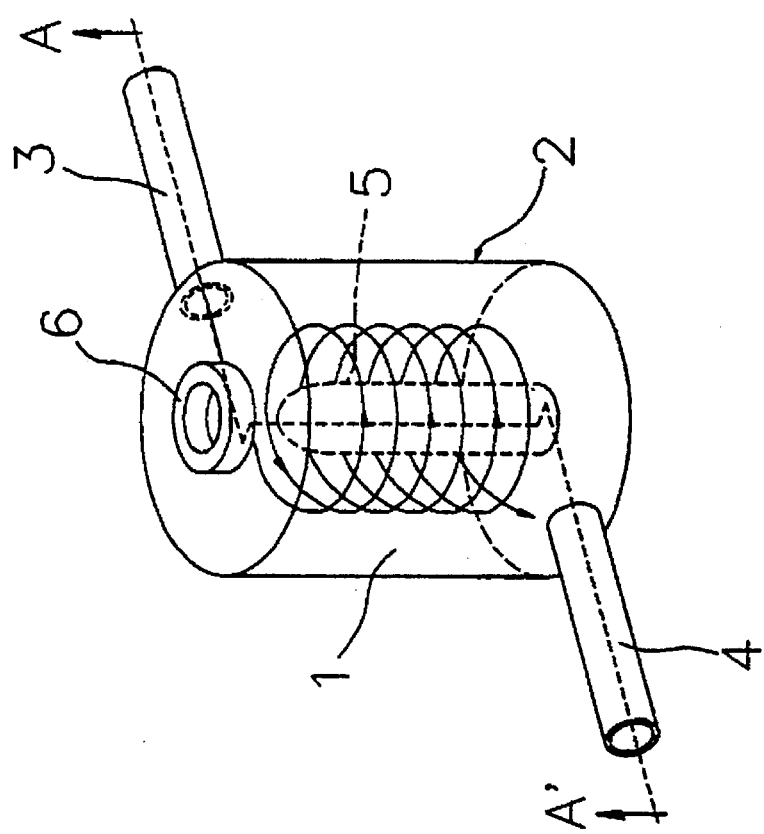
FIG. 1 is a perspective view for showing a conventional gas-liquid separating apparatus.
Figure 5:
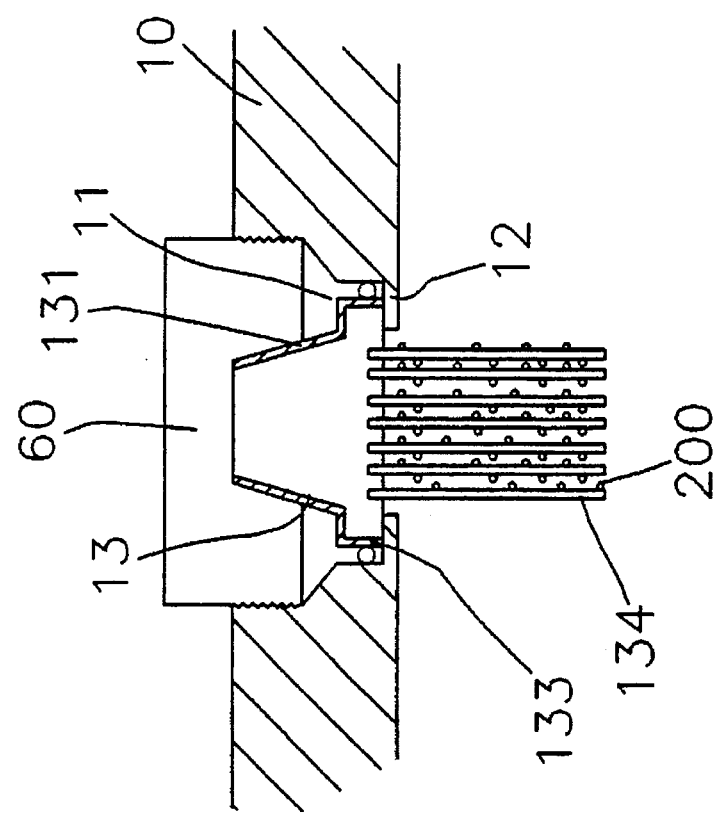
FIG. 5 is a schematic view for showing a process for separating bubbles from liquid using the gas-liquid separating device according to the present invention.

FIG. 5 is a schematic view for showing a process of separating bubbles from liquid using the gas-liquid separating device according to the present invention. When heated water generated by a gas boiler (not shown) circulates through a hot-water heating line by a pump, it flows through the gas-liquid separating device as shown in FIG. 3, which is provided in a connected portion of two heated water pipes 51 and 52. As shown in FIG. 5, small bubbles included in the liquid are collected by bubble collecting rod 134 of bubble collecting device 13. Such small bubbles 200 are continuously combined with each other and grow in size. Grown bubbles ascend by self buoyancy and pass through the space of round projected portion 133 and along the inner surface of conical vent portion 132 so that they are collected in the upper portion of conical vent portion 132. As shown in the figure, on the upper portion of conical vent portion 132 an air vent 60 which is communicated with the space of conical vent portion 132 is provided. When the volume of the air in air vent 60 which has been introduced therein through air hole 131 exceeds the predetermined value, the float descends due to the air pressure of the upper portion of air vent 60 to open air vent hole 11 so that air vent 60 vents air out. After the air venting, the float ascends again due to the buoyancy of the water to close air vent hole 11. This operation is continuously performed, so that bubbles can be easily removed from the liquid which flows through the hot-water heating line.

FIG. 6 is a partial front view for the gas-liquid separating apparatus according to another embodiment of the present invention. Members which are the same as those in FIG. 6 are indicated by the same reference numerals as in FIG. 3.

The gas-liquid separating device according to the present embodiment is the same as the gas-liquid separating device shown in FIGS. 3 and 4 except for a shape of the body shown in FIGS. 3 and 4. That is, in the gas-liquid separating apparatus, the diameter of the central portion of body 20 is larger than that of the other portions. Body 20 is provided with an enlarged portion 21 at the central portion thereof and bubble collecting device 13 is disposed on the upper portion of enlarged portion 21 to provide the gas-liquid separating apparatus. Therefore, the gas-liquid separating space can be enlarged by providing enlarged portion 21 at the central portion of body 20 if necessary. In this case, the streams of the liquid flows slowly for a moment in enlarged portion 21, so that bubbles contained in the liquid can be more completely collected by bubble collecting rod 134.

According to the present invention, a liquid is transported and circulates through the hot-water heating line by a pump and then flows through a pipe provided with the gas-liquid separating apparatus. When the liquid reaches the bubble collecting rods provided in the gas-liquid separating apparatus, small bubbles in the liquid are collected. The small bubbles are combined with the bubbles which have been collected by the bubble collecting rods to grow in size. The grown bubbles ascend by the self buoyancy along the inner surface of the conical vent portion and finally are vented out by the air vent provided on the conical vent portion. A series of above-described operational processes is successively performed so that removing bubbles of the liquid which flows through the hot-water heating line may be performed.

In the present invention, since a gas-liquid separating apparatus is installed on the hot-water heating line, the gas boiler does not need additional space for the gas-liquid separation. Therefore, the gas boiler can be easily manufactured without any increase in volume of the gas boiler, thereby reducing the production cost. Further, without any change of pipe arrangement, the gas-liquid separating apparatus may be installed at each of the connecting portions of pipes as necessary to easily remove bubbles of the liquid and then to vent out the same. Thus, the capability of the gas-liquid separation may be determined by the user's requirement.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A gas-liquid separating apparatus for separating bubbles from a liquid, comprising:

a body provided with an air vent hole opened to outside, the liquid flowing in the body; and a bubble collecting means for collecting the bubbles from the liquid to vent out the collected bubbles through the air vent hole;

the air vent hole includes a first cylindrical space portion formed at an upper outer portion of the air vent hole; a second cylindrical space portion having smaller diameter than the first cylindrical space portion, the second cylindrical space portion being located below the first cylindrical space portion; an inclined portion which connects the first cylindrical space portion to the second cylindrical portion; and an engaging round jaw on which the bubble collecting means is supported at a lower portion of the second cylindrical spaced portion.

2. The gas-liquid separating apparatus as claimed in claim 1, wherein said round engaging jaw for supporting the bubble collecting means is formed at a lower portion of the air vent hole.

3. The gas-liquid separating apparatus as claimed in claim 1, the gas-liquid separating apparatus further comprising a sealing means for sealing a gap formed between the air vent hole and the bubble collecting means.

4. The gas-liquid separating apparatus as claimed in claim 3, wherein the sealing means is an O-ring.

5. The gas-liquid separating apparatus as claimed in claim 1, wherein the bubble collecting means includes:

a plurality of cylindrical bubble collecting rods for collecting bubbles contained in the liquid;

a round projected portion for supporting upper portions of the bubble collecting rods, the round projected portion having a space portion for collecting bubbles collected by the bubble collecting rods being supported by the air vent hole; and a conical vent portion having a conical space portion connected to the space of the round projected portion and at an upper portion of the conical vent portion an air hole connected to an air vent which is opened to vent out the bubbles which have been introduced from the conical space portion when a volume of air in the air vent exceeds a predetermined value.

6. The gas-liquid separating apparatus as claimed in claim 1, wherein the body of the gas-liquid separating apparatus has a cylindrical shape suitable for connecting two pipes.

7. The gas-liquid separating apparatus as claimed in claim 1, wherein the body has a central portion where the bubble collecting means is formed and both side portions centering the central portion, and the centering portion has a diameter greater than that of the side portions.

8. A gas-liquid separating apparatus for separating bubbles from a liquid, comprising:

a body provided with an air vent hole opened to outside, the liquid flowing in the body, the air vent hole including a first cylindrical space portion formed at an upper outer portion of the air vent hole; a second cylindrical space portion having smaller diameter than the first cylindrical space portion, the second cylindrical space portion being located below the first cylindrical space portion; an inclined portion which connects the first cylindrical space portion to the second cylindrical space portion; and an engaging round jaw on which a bubble collecting means is supported at a lower portion of the second cylindrical spaced portion;

the bubble collecting means for collecting the bubbles from the liquid to vent out the collected bubbles through the air vent hole, the bubble collecting means including a plurality of cylindrical bubble collecting rods for collecting bubbles contained in the liquid; a round projected portion for supporting upper portions of the bubble collecting rods, the round projected portion having a space portion for collecting bubbles collected by the bubble collecting rods being supported by the air vent hole; and a conical vent portion having a conical space portion connected to the space of the round projected portion and at an upper portion of the conical vent portion an air hole connected to an air vent which is opened to vent out the bubbles which have been introduced from the conical space portion when a volume of air in the air vent exceeds a predetermined value; and an O-ring for sealing a gap formed between the air vent hole and the bubble collecting-means.

9. The gas-liquid separating apparatus as claimed in claim 8, wherein the body of the gas-liquid separating apparatus has a cylindrical shape suitable for connecting two pipes.

10. The gas-liquid separating apparatus as claimed in claim 8, wherein the body has a central portion where the bubble collecting means is formed and both side portion centering the central portion and the centering portion has a diameter greater than that of the side portions.

* * * * *